United States Patent
Cho et al.

(10) Patent No.: US 9,534,666 B2
(45) Date of Patent: Jan. 3, 2017

(54) PLANETARY GEAR TRAIN OF AUTOMATIC TRANSMISSION FOR VEHICLES

(71) Applicant: Hyundai Motor Company, Seoul (KR)

(72) Inventors: Wonmin Cho, Hwaseong-si (KR); Jae Chang Kook, Hwaseong-si (KR); Myeong Hoon Noh, Seongnam-si (KR); Seongwook Ji, Ansan-si (KR); Kangsoo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/884,573

(22) Filed: Oct. 15, 2015

(65) Prior Publication Data

US 2016/0169347 A1 Jun. 16, 2016

(30) Foreign Application Priority Data

Dec. 11, 2014 (KR) .......................... 10-2014-0178385

(51) Int. Cl.
*F16H 3/66* (2006.01)

(52) U.S. Cl.
CPC .......... *F16H 3/66* (2013.01); *F16H 2200/0069* (2013.01); *F16H 2200/2012* (2013.01); *F16H 2200/2046* (2013.01)

(58) Field of Classification Search
CPC ................ F16H 3/66; F16H 2200/2046; F16H 200/2012; F16H 2200/0069
USPC .......................................... 475/275–291, 330
See application file for complete search history.

(56) References Cited

U.S. PATENT DOCUMENTS

| | | | |
|---|---|---|---|
| 2012/0231917 A1 | 9/2012 | Phillips et al. | |
| 2015/0094184 A1* | 4/2015 | Lippert | F16H 3/66 475/275 |
| 2015/0226290 A1* | 8/2015 | Lippert | F16H 3/66 475/277 |
| 2016/0160963 A1* | 6/2016 | Ji | F16H 3/66 475/277 |
| 2016/0169338 A1* | 6/2016 | Cho | F16H 3/66 475/277 |
| 2016/0169343 A1* | 6/2016 | Cho | F16H 3/66 475/275 |

(Continued)

FOREIGN PATENT DOCUMENTS

| | | |
|---|---|---|
| KR | 10-2013-0077146 A | 7/2013 |
| KR | 10-1448789 B1 | 10/2014 |

*Primary Examiner* — Roger Pang
(74) *Attorney, Agent, or Firm* — Morgan, Lewis & Bockius LLP

(57) ABSTRACT

A planetary gear train of an automatic transmission for a vehicle may include an input shaft into which power of an engine is input, an output shaft that outputs shifted power, a first planetary gear set, a second planetary gear set, a third planetary gear set, a fourth planetary gear set, a first rotational shaft selectively connected to a transmission housing, a second rotational shaft directly connected to the input shaft, a third rotational shaft selectively connected to the transmission housing, a fourth rotational shaft selectively connected to the first rotational shaft and the second rotational shaft, a fifth rotational shaft, a sixth rotational shaft selectively connected to the first rotational shaft, a seventh rotational shaft directly connected to the output shaft, and selectively connected to the fifth rotational shaft, an eighth rotational shaft, and six friction elements.

9 Claims, 2 Drawing Sheets

(56) References Cited

U.S. PATENT DOCUMENTS

2016/0230848 A1* 8/2016 Cho .................... F16H 3/66

* cited by examiner

FIG. 2

|      | C1 | C2 | C3 | C4 | B1 | B2 | Gear ratio |
|------|----|----|----|----|----|----|------------|
| 1ST  |    |    | O  | O  |    | O  | 4.700      |
| 2ND  |    | O  |    | O  |    | O  | 1.932      |
| 3RD  | O  |    |    | O  |    | O  | 1.632      |
| 4TH  | O  | O  |    |    |    | O  | 1.220      |
| 5TH  | O  | O  |    | O  |    |    | 1.000      |
| 6TH  | O  | O  |    |    | O  |    | 0.787      |
| 7TH  | O  |    |    | O  | O  |    | 0.633      |
| 8TH  |    | O  |    | O  | O  |    | 0.580      |
| 9TH  |    |    | O  | O  | O  |    | 0.459      |
| 10TH |    | O  | O  |    | O  |    | 0.315      |
| REV  |    | O  | O  |    |    | O  | 2.220      |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2014-0178385 filed Dec. 11, 2014, the entire contents of which is incorporated herein for all purposes by this reference.

BACKGROUND OF THE INVENTION

Field of the Invention

The present invention relates to an automatic transmission for vehicles. More particularly, the present invention relates to a planetary gear train of an automatic transmission for vehicles that implements 10 forward speeds with a minimal configuration to improve power transmission performance and fuel efficiency.

Description of the Related Art

In recent years, increasing oil prices have forced auto manufacturers into extreme competition in order to enhance fuel efficiency.

As a result, research into reduction of weight and enhancement of fuel efficiency through down-sizing has been conducted in the case of an engine, and research for simultaneously securing operability and fuel efficiency competitiveness through multi-stages has been conducted in the case of an automatic transmission.

However, in the automatic transmission, as the number of speeds increases, the number of internal components increases, and as a result, work efficiency while mounting the transmission in a vehicle and power transmission efficiency may deteriorate and the manufacturing cost and weight of the vehicle may increase.

Accordingly, development of a planetary gear train which may bring about maximum efficiency with a small number of components may be important in order to increase a fuel efficiency enhancement effect through the multi-stages.

In this aspect, in recent years, 8- and 9-speed automated transmissions have tended to be implemented, and research and development of a planetary gear train capable of implementing more speeds has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an automatic transmission for vehicles that implements ten forward speeds and one reverse speed with a minimal configuration, and that improves power transmission efficiency and fuel consumption through multiple speeds.

According to various aspects of the present invention, a planetary gear train of an automatic transmission for a vehicle may include an input shaft into which power of an engine is input, an output shaft that outputs shifted power, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear, a first rotational shaft including the first and second sun gears and selectively connected to a transmission housing, a second rotational shaft including the first planetary carrier and directly connected to the input shaft, a third rotational shaft including the first ring gear, the second sun gear, and the fourth sun gear, and selectively connected to the transmission housing, a fourth rotational shaft including the second planetary carrier, and selectively connected to the first rotational shaft and the second rotational shaft, a fifth rotational shaft including the second ring gear and the third sun gear, a sixth rotational shaft including the third ring gear, and selectively connected to the first rotational shaft, a seventh rotational shaft including the fourth planetary carrier, directly connected to the output shaft, and selectively connected to the fifth rotational shaft, an eighth rotational shaft including the third planetary carrier and the fourth ring gear, and six friction elements selectively connecting one of the rotational shafts to another rotational shaft, and selectively connecting the rotational shafts to the transmission housing.

Each of the first, second, third, and fourth planetary gear sets may be a single pinion planetary gear set.

The first, second, third, and fourth planetary gear sets may be sequentially disposed from an engine side.

The six friction elements may include a first clutch interposed between the second rotational shaft and the fourth rotational shaft, a second clutch interposed between the fifth rotational shaft and the seventh rotational shaft, a third clutch interposed between the first rotational shaft and the fourth rotational shaft, a fourth clutch interposed between the first rotational shaft and the sixth rotational shaft, a first brake interposed between the third rotational shaft and the transmission housing, and a second brake interposed between the first rotational shaft and the transmission housing.

Speeds implemented by selectively operating the six friction elements may include a forward first speed implemented by simultaneously operating the third clutch, the fourth clutch, and the second brake, a forward second speed implemented by simultaneously operating the second clutch, the fourth clutch, and the second brake, a forward third speed implemented by simultaneously operating the first clutch, the fourth clutch, and the second brake, a forward fourth speed implemented by simultaneously operating the first clutch, the second clutch, and the second brake, a forward fifth speed implemented by simultaneously operating the first clutch, the second clutch, and the fourth clutch, a forward sixth speed implemented by simultaneously operating the first clutch, the second clutch, and the first brake, a forward seventh speed implemented by simultaneously operating the first clutch, the fourth clutch, and the first brake, a forward eighth speed implemented by simultaneously operating the second clutch, the fourth clutch, and the first brake, a forward ninth speed implemented by simultaneously operating the third clutch, the fourth clutch, and the first brake, a forward tenth speed implemented by simultaneously operating the second clutch, the third clutch, and the first brake, and a reverse speed implemented by simultaneously operating the second clutch, the third clutch, and the second brake.

According to various aspects of the present invention, a planetary gear train of an automatic transmission for a vehicle may include an input shaft into which power of an engine is input, an output shaft that outputs the shifted power, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, and a fourth planetary gear set including a fourth sun gear, a fourth planetary carrier, and a fourth ring gear, in which the input shaft may be directly connected to the first planetary carrier, the output shaft may be connected to the fourth planetary carrier, the first ring gear, the second sun gear, and the fourth sun gear are directly connected, the second ring gear and the third sun gear are directly connected, the third planetary carrier and the fourth ring gear are directly connected, the planetary gear train may further include a first clutch selectively connecting the first planetary carrier and the second planetary carrier, a second clutch selectively connecting the third sun gear and the fourth planetary carrier, a third clutch selectively connecting the first sun gear and the second planetary carrier, a fourth clutch selectively connecting the first sun gear and the third ring gear, a first brake selectively connecting the first ring gear, the second sun gear, and fourth sun gear to the transmission housing, and a second brake selectively connecting the first sun gear to the transmission housing.

According various embodiments of the present invention, ten forward speeds and one reverse speed are implemented by combining four planetary gear sets configured by simple planetary gear sets with six friction elements to improve power transmission performance and fuel efficiency.

Further, the planetary gear train according to various embodiments of the present invention may improve the power transmission efficiency and the fuel efficiency through the multiple speeds of the automatic transmission.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of speeds of respective friction elements applied to the exemplary planetary gear train according to the present invention.

Figure 1:
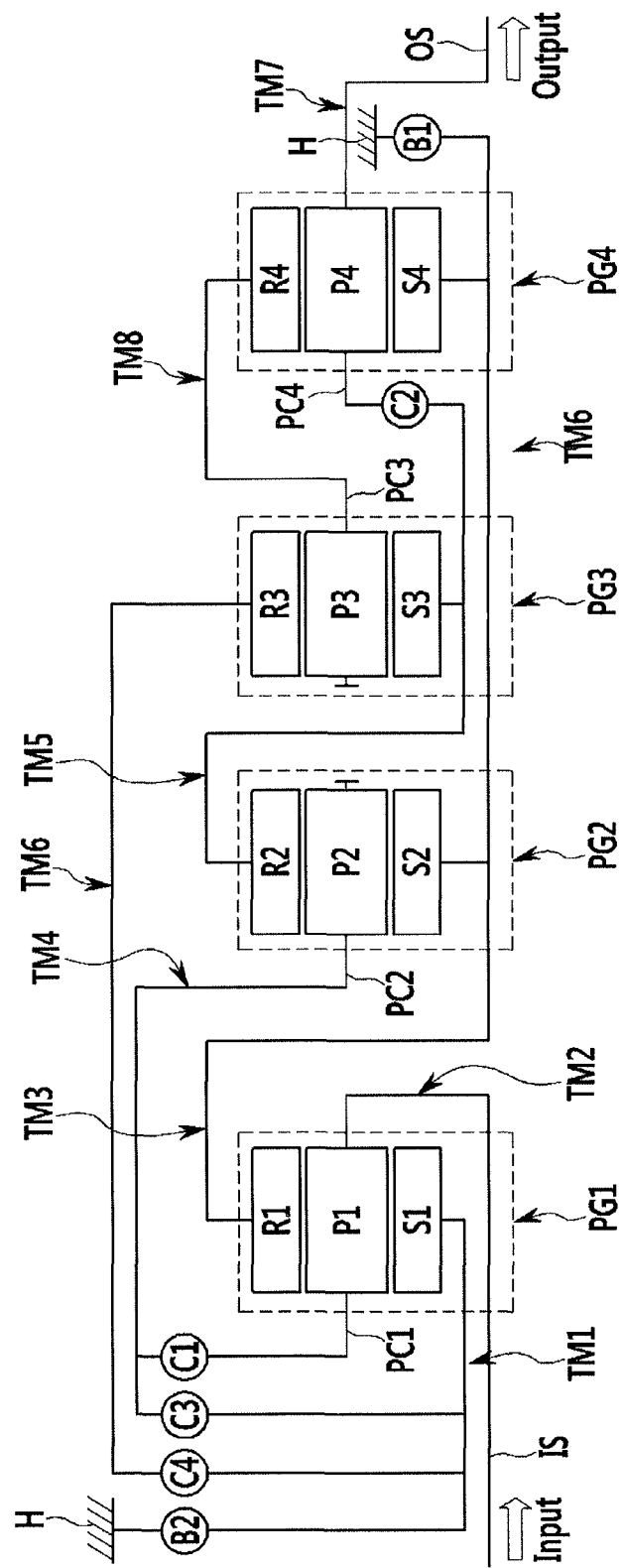
FIG. 1 is a configuration diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a planetary gear train according to various embodiments of the present invention.

Referring to FIG. 1, a planetary gear train according to various embodiments of the present invention includes first, second, third, and fourth planetary gear sets PG1, PG2, PG3, and PG4 disposed on a same axial line, an input shaft IS, an output shaft OS, eight rotational shafts TM1 to TM8 that directly connect respective rotational elements of the first, second, third, and fourth planetary gear sets PG1, PG2, PG3, and PG4 to each other, six friction elements C1 to C4, B1, and B2, and a transmission housing H.

Rotation power input from the input shaft IS is transmitted by an inter-complementation operation of the first, second, third, and fourth planetary gear sets PG1, PG2, PG3, and PG4 to be output through the output shaft OS.

In addition, the respective simple planetary gear sets are disposed in the order of the first, second, third, and fourth planetary gear sets PG1, PG2, PG3, and PG4 from an engine side.

The input shaft IS is an input member, and rotational power from a crankshaft (not illustrated) of an engine (not illustrated) is torque-converted through a torque converter (not illustrated) to be input into the input shaft IS.

The output shaft OS as an output member is disposed on the same axial line as the input shaft IS to transmit transmitted driving power to a driving shaft through a differential.

The first planetary gear set PG1 as a single-pinion planetary gear set includes a first sun gear S1, a first planetary carrier PC1 that rotatably supports a first pinion P1 which outer-engages with the first sun gear S1, and a first ring gear R1 which inner-engages with the first pinion P1 as rotation elements.

The second planetary gear set PG2 as a single-pinion planetary gear set includes a second sun gear S2, a second planetary carrier PC2 that rotatably supports a second pinion P2 which outer-engages with the second sun gear S2, and a second ring gear R2 which inner-engages with the second pinion P2.

The third planetary gear set PG3 as the single-pinion planetary gear set includes a third sun gear S3, a third planetary carrier PC3 that rotatably supports a third pinion P3 which outer-engages with the third sun gear S3, and a third ring gear R3 which inner-engages with the third pinion P3.

The fourth planetary gear set PG4 as the single-pinion planetary gear set includes a fourth sun gear S4, a fourth planetary carrier PC4 that rotatably supports a fourth pinion P4 which outer-engages with the fourth sun gear S4, and a fourth ring gear R4 which inner-engages with the fourth pinion P4.

In the first, second, third, and fourth planetary gear sets PG1, PG2, PG3, and PG4, one or more rotation elements are directly connected to each other to operate with a total of eight rotational shafts TM1 to TM8.

In the third and fourth planetary gear sets PG3 and PG4, two rotation elements are directly connected to each other to operate with a total of four rotation elements.

Configurations of the eight rotational shafts TM1 to TM8 will be described below.

The first rotational shaft TM1 is configured to include the first sun gear S1, and is selectively connected to the transmission housing H.

The second rotational shaft TM2 is configured to include the first planetary carrier PC1, and continuously operates as the input element while being directly connected to the input shaft IS.

The third rotational shaft TM3 is configured to include the first ring gear R1, the second sun gear S2, and the fourth sun gear S4, and is selectively connected to the transmission housing H.

The fourth rotational shaft TM4 is configured to include the second planetary carrier PC2, and is selectively connected to the first rotational shaft TM1 and the second rotational shaft TM2.

The fifth rotational shaft TM5 is configured to include the second ring gear R2 and the third sun gear S3.

The sixth rotational shaft TM6 is configured to include the third ring gear R3, and is selectively connected the first rotational shaft TM1.

The seventh rotational shaft TM7 is configured to include the fourth planetary carrier PC4, is directly connected to the output shaft OS, and is selectively connected to the fifth rotational shaft TM5.

The eighth rotational shaft TM8 is configured to include the third planetary carrier PC3 and the fourth ring gear R4.

In addition, among the rotational shafts TM1 to TM8, four clutches C1, C2, C3, and C4 which are friction elements are disposed at portions where the rotational shafts are selectively connected to each other.

Further, among the rotational shafts TM1 to TM8, two brakes B1 and B2 which are the friction elements are disposed at portions selectively connected to the transmission housing H.

Layout positions of the six friction elements C1 to C4, B1, and B2 will be described below.

The first clutch C1 is interposed between the second rotational shaft TM2 and the fourth rotational shaft TM4, and as a result, the fifth rotational shaft TM5 and the sixth rotational shaft TM6 are selectively integrated with each other.

The second clutch C2 is interposed between the fifth rotational shaft TM5 and the seventh rotational shaft TM7, and as a result, the fifth rotational shaft TM5 and the seventh rotational shaft TM7 are selectively integrated with each other.

The third clutch C3 is interposed between the first rotational shaft TM1 and the fourth rotational shaft TM4, and as a result, the first rotational shaft TM1 and the fourth rotational shaft TM4 are selectively integrated with each other.

The fourth clutch C4 is interposed between the first rotational shaft TM1 and the sixth rotational shaft TM6, and as a result, the first rotational shaft TM1 and the sixth rotational shaft TM6 are selectively integrated with each other.

The first brake B1 is interposed between the third rotational shaft TM3 and the transmission housing H to allow the third rotational shaft TM3 to operate as a selective fixed element.

The second brake B2 is interposed between the first rotational shaft TM1 and the transmission housing H to allow the first rotational shaft TM1 to operate as a selective fixed element.

The respective friction elements constituted by the first, second, third, and fourth clutches C1, C2, C3, and C4 and the first and second brakes B1 and B2 as described above may be configured by multiple-disk hydraulic friction joining units which are friction-joined by hydraulic pressure.

FIG. 2 is an operation table for each of speeds of respective friction elements applied to the planetary gear train according to various embodiments of the present invention.

As shown in FIG. 2, in the planetary gear train according to various embodiments of the present invention, while three friction elements operate in the respective speeds, power transmission is performed.

A first forward speed 1ST is implemented by simultaneously operating the third and fourth clutches C3 and C4 and the second brake B2.

A second forward speed 2ND is implemented by simultaneously operating the second and fourth clutches C2 and C4 and the second brake B2.

A third forward speed 3RD is implemented by simultaneously operating the first and fourth clutches C1 and C4 and the second brake B2.

A fourth forward speed 4TH is implemented by simultaneously operating the first and second clutches C1 and C2 and the second brake B2.

A fifth forward speed 5TH is implemented by simultaneously operating the first, second, and fourth clutches C1, C2, and C4.

A sixth forward speed 6TH is implemented by simultaneously operating the first and second clutches C1 and C2 and the first brake B1.

A seventh forward speed 7TH is implemented by simultaneously operating the first and fourth clutches C1 and C4 and the first brake B1.

An eighth forward speed 8TH is implemented by simultaneously operating the second and fourth clutches C2 and C4 and the first brake B1.

A ninth forward speed 9TH is implemented by simultaneously operating the third and fourth clutches C3 and C4 and the first brake B1.

A tenth forward speed 10TH is implemented by simultaneously operating the second and third clutches C2 and C3 and the first brake B1.

A reverse speed REV is implemented by simultaneously operating the second and third clutches C2 and C3 and the second brake B2.

The above shifting processes will now be described in detail.

In the first forward speed 1ST, when the third clutch C3, the fourth clutch C4, and the second brake B2 are simultaneously operated, the first rotational shaft TM1 is connected to the fourth shaft TM4 and the sixth rotational shaft TM6 by operation of the third clutch C3 and the fourth clutch C4, and the second rotational shaft TM2 receives driving power. The first rotational shaft TM1 is operated as a fixed element by operation of the second brake B2, the first forward speed 1ST is realized, and thus driving power is output though the seventh rotational shaft TM7.

In the second forward speed 2ND, when the second clutch C2, the fourth clutch C4, and the second brake B2 are simultaneously operated, the fifth rotational shaft TM5 is connected to the seventh rotational shaft TM7 by operation of the second clutch C2. The first rotational shaft TM1 is connected to the sixth rotational shaft TM6 by operation of the fourth clutch C4, and the second rotational shaft TM2 receives driving power. The first rotational shaft TM1 is operated as a fixed element by operation of the second brake B2, the second forward speed 2ND is realized, and thus driving power is output through the seventh rotational shaft TM7.

In the third forward speed 3RD, when the first clutch C1, the fourth clutch C4, and the second brake B2 are simultaneously operated, the second rotational shaft TM2 is connected to the fourth rotational shaft TM4 by operation of the first clutch C1. The first rotational shaft TM1 is connected to the sixth rotational shaft TM6 by operation of the fourth clutch C4, and the second rotational shaft TM2 receives driving power. The first rotational shaft TM1 is operated as a fixed element by operation of the second brake B2, the third forward speed 3RD is realized, and thus driving power is output through the seventh rotational shaft TM7.

In the fourth forward speed 4TH, when the first clutch C1, the second clutch C2, and the second brake B2 are simultaneously operated, the second rotational shaft TM2 is connected to the fourth rotational shaft TM4 by operation of the first clutch C1. The fifth rotational shaft TM5 is connected to the seventh rotational shaft TM7 by operation of the second clutch C2, and the second rotational shaft TM2 receives driving power. The first rotational shaft TM1 is operated as a fixed element by operation of the second brake B2, the fourth forward speed 4TH is realized, and thus driving power is output through the seventh rotational shaft TM7.

In the fifth forward speed 5TH, when the first clutch C1, the second clutch C2, and the fourth clutch C4 are simultaneously operated, the second rotational shaft TM2 is connected to the fourth rotational shaft TM4 by operation of the first clutch C1. The fifth rotational shaft TM5 is connected to the seventh rotational shaft TM7 by operation of the second clutch C2. The first rotational shaft TM1 is connected to the sixth rotational shaft TM6 by operation of the fourth clutch C4, the fifth forward speed 5TH is realized, and thus driving power is output through the second rotational shaft TM2.

In the sixth forward speed 6TH, when the first clutch C1, the second clutch C2, and the first brake B1 are simultaneously operated, the second rotational shaft TM2 is connected to the fourth rotational shaft TM4 by operation of the first clutch C1. The fifth rotational shaft TM5 is connected to the seventh rotational shaft TM7 by operation of the second clutch C2, and the second rotational shaft TM2 receives driving power. The third rotational shaft TM3 is operated as a fixed element by operation of the first brake B1, the sixth forward speed 6TH is realized, and thus driving power is output through the seventh rotational shaft TM7.

In the seventh forward speed 7TH, when the first clutch C1, the fourth clutch C4, and the first brake B1 are simultaneously operated, the second rotational shaft TM2 is connected to the fourth rotational shaft TM4 by operation of the first clutch C1. The first rotational shaft TM1 is connected to the sixth rotational shaft TM6 by operation of the fourth clutch C4, and the second rotational shaft TM2 receives driving power. The third rotational shaft TM3 is operated as a fixed element by operation of the first brake B1, the seventh forward speed 7TH is realized, and thus driving power is output through the seventh rotational shaft TM7.

In the eighth forward speed 8TH, when the second clutch C2, the fourth clutch C4, and the first brake B1 are simultaneously operated, the fifth rotational shaft TM5 is connected to the seventh rotational shaft TM7 by operation of the second clutch C2. The first rotational shaft TM1 is connected to the sixth rotational shaft TM6 by operation of the fourth clutch C4, and the second rotational shaft TM2 receives driving power. The third rotational shaft TM3 is operated as a fixed element by operation of the first brake B1, the eighth forward speed 8TH is realized, and thus driving power is output through the seventh rotational shaft TM7.

In the ninth forward speed 9TH, when the third clutch C2, the fourth clutch C4, and the first brake B1 are simultaneously operated, the first rotational shaft TM1 is connected to the fourth rotational shaft TM4 by operation of the third clutch C3. The first rotational shaft TM1 is connected to the sixth rotational shaft TM6 by operation of the fourth clutch C4, and the second rotational shaft TM2 receives driving power. The third rotational shaft TM3 is operated as a fixed element by operation of the first brake B1, the ninth forward speed 9TH is realized, and thus driving power is output through the seventh rotational shaft TM7.

In the tenth forward speed 10TH, when the second clutch C2, the third clutch C3, and the first brake B1 are simultaneously operated, the fifth rotational shaft TM5 is connected to the seventh rotational shaft TM7 by operation of the second clutch C2. The first rotational shaft TM1 is connected to the fourth rotational shaft TM4 by operation of the third clutch C3, and the second rotational shaft TM2 receives driving power. The third rotational shaft TM3 is operated as a fixed element by operation of the first brake B1, the tenth forward speed 10TH is realized, and thus driving power is output through the seventh rotational shaft TM7.

In the reverse speed REV, when the second clutch C2, the third clutch C3 and the second brake B2 are simultaneously operated, the fifth rotational shaft TM5 is connected to the seventh rotational shaft TM7 by operation of the second clutch C2. The first rotational shaft TM1 is connected to the fourth rotational shaft TM4 by operation of the third clutch C3, and the second rotational shaft TM2 receives driving power. The first rotational shaft TM1 is operated as a fixed element by operation of the first brake B1, the reverse speed REV is realized, and thus driving power is output through the seventh rotational shaft TM7.

As described above, in the planetary gear train according to various embodiments of the present invention, four planetary gear sets PG1, PG2, PG3, and PG4 may implement the ten forward speeds and one reverse speed through the operation-control of four clutches C1, C2, C3, and C4 and two brakes B1 and B2.

Further, the planetary gear train according to various embodiments of the present invention may improve the power transmission efficiency and the fuel efficiency through the multi-stages of the automatic transmission.

The planetary gear train according to various embodiments of the present invention may also improve the power transmission efficiency and the fuel efficiency through the multiple speeds of the automatic transmission.

In addition, three friction elements operate for each speed, and as a result, a friction drag loss is decreased by minimizing the number of friction elements which operate, thereby improving the power transmission efficiency and the fuel efficiency.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft into which power of an engine is input;
   an output shaft that outputs shifted power;
   a first planetary gear set including a first sun gear, a first planetary carrier, and a first ring gear;
   a second planetary gear set including a second sun gear, a second planetary carrier, and a second ring gear;
   a third planetary gear set including a third sun gear, a third planetary carrier, and a third ring gear;
   a fourth planetary gear set including a fourth sun gear, a fourth planetary carrier, and a fourth ring gear;
   a first rotational shaft including the first sun gear and selectively connected to a transmission housing;
   a second rotational shaft including the first planetary carrier and directly connected to the input shaft;
   a third rotational shaft including the first ring gear, the second sun gear, and the fourth sun gear, and selectively connected to the transmission housing;
   a fourth rotational shaft including the second planetary carrier, and selectively connected to the first rotational shaft and the second rotational shaft;
   a fifth rotational shaft including the second ring gear and the third sun gear;
   a sixth rotational shaft including the third ring gear, and selectively connected to the first rotational shaft;
   a seventh rotational shaft including the fourth planetary carrier, directly connected to the output shaft, and selectively connected to the fifth rotational shaft;
   an eighth rotational shaft including the third planetary carrier and the fourth ring gear; and
   six friction elements selectively connecting one of the rotational shafts to another rotational shaft, and selectively connecting the rotational shafts to the transmission housing.

2. The planetary gear train of the automatic transmission for the vehicle of claim 1, wherein each of the first, second, third, and fourth planetary gear sets comprises a single pinion planetary gear set.

3. The planetary gear train of the automatic transmission for the vehicle of claim 1, wherein the first, second, third, and fourth planetary gear sets are sequentially disposed from an engine side.

4. The planetary gear train of the automatic transmission for the vehicle of claim 1, wherein the six friction elements include:
   a first clutch interposed between the second rotational shaft and the fourth rotational shaft;
   a second clutch interposed between the fifth rotational shaft and the seventh rotational shaft;
   a third clutch interposed between the first rotational shaft and the fourth rotational shaft;
   a fourth clutch interposed between the first rotational shaft and the sixth rotational shaft;
   a first brake interposed between the third rotational shaft and the transmission housing; and
   a second brake interposed between the first rotational shaft and the transmission housing.

5. The planetary gear train of the automatic transmission for the vehicle of claim 4, wherein speeds implemented by selectively operating the six friction elements include:
   a forward first speed implemented by simultaneously operating the third clutch, the fourth clutch, and the second brake;
   a forward second speed implemented by simultaneously operating the second clutch, the fourth clutch, and the second brake;
   a forward third speed implemented by simultaneously operating the first clutch, the fourth clutch, and the second brake;
   a forward fourth speed implemented by simultaneously operating the first clutch, the second clutch, and the second brake;
   a forward fifth speed implemented by simultaneously operating the first clutch, the second clutch, and the fourth clutch;
   a forward sixth speed implemented by simultaneously operating the first clutch, the second clutch, and the first brake;
   a forward seventh speed implemented by simultaneously operating the first clutch, the fourth clutch, and the first brake;
   a forward eighth speed implemented by simultaneously operating the second clutch, the fourth clutch, and the first brake;
   a forward ninth speed implemented by simultaneously operating the third clutch, the fourth clutch, and the first brake;
   a forward tenth speed implemented by simultaneously operating the second clutch, the third clutch, and the first brake; and
   a reverse speed implemented by simultaneously operating the second clutch, the third clutch, and the second brake.

6. A planetary gear train of an automatic transmission for a vehicle, comprising: an input shaft into which power of an engine is input; an output shaft that outputs the shifted power; a first planetary gear set including a first sun gear, a first planetary carrier, and a first ring gear; a second planetary gear set including a second sun gear, a second planetary carrier, and a second ring gear; a third planetary gear set including a third sun gear, a third planetary carrier, and a third ring gear; and a fourth planetary gear set including a fourth sun gear, a fourth planetary carrier, and a fourth ring gear,
   wherein the input shaft is directly connected to the first planetary carrier,
   the output shaft is connected to the fourth planetary carrier,
   the first ring gear, the second sun gear, and the fourth sun gear are directly connected,
   the second ring gear and the third sun gear are directly connected,
   the third planetary carrier and the fourth ring gear are directly connected, the planetary gear train further comprising:
   a first clutch selectively connecting the first planetary carrier and the second planetary carrier;

a second clutch selectively connecting the third sun gear and the fourth planetary carrier;
a third clutch selectively connecting the first sun gear and the second planetary carrier;
a fourth clutch selectively connecting the first sun gear and the third ring gear;
a first brake selectively connecting the first ring gear, the second sun gear, and fourth sun gear to the transmission housing; and
a second brake selectively connecting the first sun gear to the transmission housing.

7. The planetary gear train of the automatic transmission for the vehicle of claim 6, wherein each of the first, second, third, and fourth planetary gear sets comprises a single pinion planetary gear set.

8. The planetary gear train of the automatic transmission for the vehicle of claim 6, wherein the first, second, third, fourth planetary gear sets are sequentially disposed from an engine side.

9. The planetary gear train of the automatic transmission for the vehicle of claim 6, wherein speeds implemented by selectively operating the six friction elements include:
a forward first speed implemented by simultaneously operating the third clutch, the fourth clutch, and the second brake;
a forward second speed implemented by simultaneously operating the second clutch, the fourth clutch, and the second brake;
a forward third speed implemented by simultaneously operating the first clutch, the fourth clutch, and the second brake;
a forward fourth speed implemented by simultaneously operating the first clutch, the second clutch, and the second brake;
a forward fifth speed implemented by simultaneously operating the first clutch, the second clutch, and the fourth clutch;
a forward sixth speed implemented by simultaneously operating the first clutch, the second clutch, and the first brake;
a forward seventh speed implemented by simultaneously operating the first clutch, the fourth clutch, and the first brake;
a forward eighth speed implemented by simultaneously operating the second clutch, the fourth clutch, and the first brake;
a forward ninth speed implemented by simultaneously operating the third clutch, the fourth clutch, and the first brake;
a forward tenth speed implemented by simultaneously operating the second clutch, the third clutch, and the first brake; and
a reverse speed implemented by simultaneously operating the second clutch, the third clutch, and the second brake.

* * * * *